United States Patent
Simon

(10) Patent No.: US 11,554,451 B2
(45) Date of Patent: Jan. 17, 2023

(54) RECIPROCATING WELDING DEVICE

(71) Applicant: Frank Simon, Sapulpa, OK (US)

(72) Inventor: Frank Simon, Sapulpa, OK (US)

(*) Notice: Subject to any disclaimer, the term of this patent is extended or adjusted under 35 U.S.C. 154(b) by 970 days.

(21) Appl. No.: 16/501,312

(22) Filed: Mar. 23, 2019

(65) Prior Publication Data

US 2019/0329365 A1 Oct. 31, 2019

Related U.S. Application Data

(60) Provisional application No. 62/762,249, filed on Apr. 25, 2018.

(51) Int. Cl.
| | | |
|---|---|---|
| *B23K 37/00* | (2006.01) | |
| *B23K 9/00* | (2006.01) | |
| *B23K 37/02* | (2006.01) | |
| *B23K 9/28* | (2006.01) | |
| *B23K 9/028* | (2006.01) | |

(52) U.S. Cl.
CPC ............ *B23K 37/0229* (2013.01); *B23K 9/28* (2013.01); *B23K 9/0286* (2013.01); *B23K 37/0276* (2013.01)

(58) Field of Classification Search
CPC .............. B23K 20/1205; B23K 20/123; B23K 20/121; B23K 37/0282; B23K 37/0452; B23K 37/047; B23K 9/0953
See application file for complete search history.

(56) References Cited

U.S. PATENT DOCUMENTS

| | | | | |
|---|---|---|---|---|
| 5,813,593 A | * | 9/1998 | Galaske, Jr. ....... | B23K 20/1205 228/2.1 |
| 6,003,752 A | | 12/1999 | Searle | |
| 6,463,349 B2 | * | 10/2002 | White ................... | B33Y 40/00 700/182 |
| 7,624,907 B2 | * | 12/2009 | Alessi ................ | B23K 20/1205 228/2.1 |
| 7,743,964 B2 | * | 6/2010 | Maeda ................. | B23K 3/0623 228/248.1 |
| 7,882,996 B2 | * | 2/2011 | Alessi ................ | B23K 20/1205 228/2.1 |
| 8,987,637 B1 | * | 3/2015 | Messina ............. | B23K 37/0276 219/136 |
| 9,102,002 B1 | | 8/2015 | Jusionis | |
| 9,592,567 B2 | | 3/2017 | Weiss | |
| 10,850,347 B2 | * | 12/2020 | Johnson ............... | B23K 20/123 |
| 2002/0060211 A1 | * | 5/2002 | Marhofer ............ | B23K 9/0286 219/60 R |
| 2002/0104833 A1 | * | 8/2002 | Bradley ............ | B23K 26/0884 219/121.63 |
| 2008/0308611 A1 | * | 12/2008 | Alessi ................ | B23K 20/1205 228/2.1 |
| 2009/0321497 A1 | * | 12/2009 | Alessi ................ | B23K 20/1205 228/2.1 |
| 2019/0329365 A1 | * | 10/2019 | Simon ................ | B23K 37/0229 |

* cited by examiner

*Primary Examiner* — Erin B Saad
(74) *Attorney, Agent, or Firm* — Randal Homburg

(57) ABSTRACT

A reciprocating welding device using a microcontroller to control a stepper motor to control a welding head for the stationary welding of a workpiece, the microcontroller allowing for adjustment of the welding head reciprocating stroke speed, the width of each stroke, and a pause from 0-1 second at the sides to control the wash of the welding edges, having a manipulator, the welding head and the oscillator contained in a single unit and provided on a multiple adjustment portable stand.

6 Claims, 8 Drawing Sheets

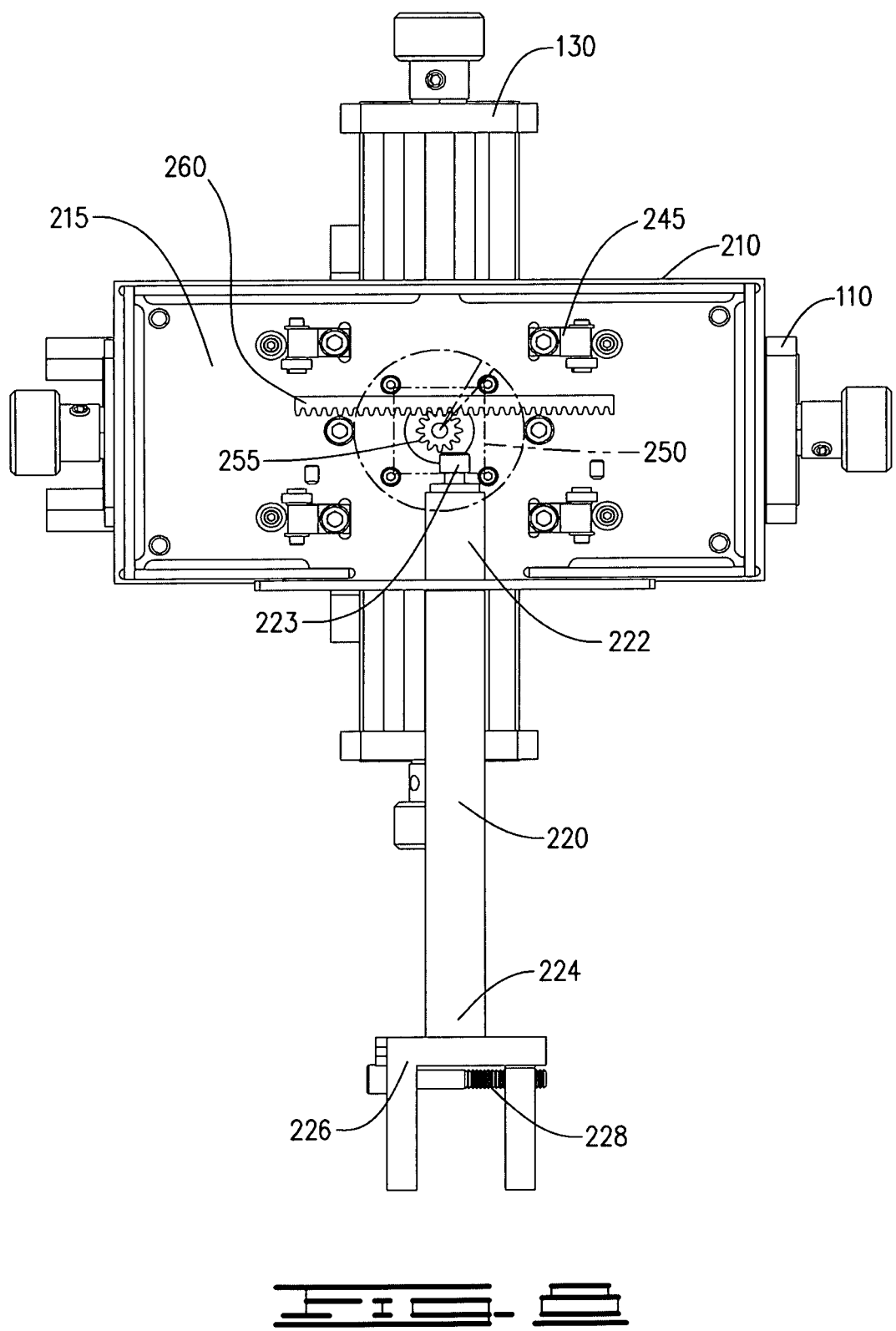

RECIPROCATING WELDING DEVICE

CROSS REFERENCE TO RELATED APPLICATIONS

Applicant claims the benefit of U.S. Provisional Patent Application No. 62/762,249, filed on Apr. 25, 2018, by the same inventor.

I. BACKGROUND OF THE INVENTION

1. Field of Invention

A reciprocating welding device using a microcontroller to control a stepper motor to control a welding head for the stationary welding of a workpiece, the microcontroller allowing for adjustment of the welding head reciprocating stroke speed, the width of each stroke, and a pause from 0-1 second at the sides to control the wash of the welding edges, having a manipulator, the welding head and the oscillator contained in a single unit and provided on a multiple adjustment portable stand.

2. Description of Prior Art

A preliminary review of prior art patents was conducted by the applicant which reveal prior art patents in a similar field or having similar use. However, the prior art inventions do not disclose the same or similar elements as the present reciprocating welding device, nor do they present the material components in a manner contemplated or anticipated in the prior art.

Applicant is aware of several products on the market that provide oscillating head designs relative to welding devices. Most deal with large mechanical devices which are heavy in weight and are generally stationary, where the material to be welded is required to be moved to the device. The present device is small and lightweight and provided as either a small stationary device attached to a welding head or attached to a portable multiple adjusting support structure which can be provided to the material to be welded and positioned at nearly any angle, height and relative distance from the potential weld seam. The present device does not provide for a welding machine, but a tool to be used in conjunction with a welder which provides a complete oscillator/manipulator package without requiring a permanent location which requires a large amount of floor space. Some of the prior oscillating welding devices are sold on the market by BUG-O Welding Systems, Jimmy Jammer/Stinger, MILLER®, PANJIRIS® EZ Link Systems, Profax/LENCO®, and LINCOLN® Electric.

A TIG welding device is disclosed in U.S. Pat. No. 9,592,567 to Weiss, which provides a welding machine having an electrode for carrying out TIG welding on a workpiece which is manipulated by a device which can provide oscillating movement to the electrode. The welding rod is manually introduced to the workpiece while the electrode is mechanically manipulated. An orbital welding device is identified in U.S. Pat. No. 9,102,002 to Jusionis, which provides a welding torch, an Automatic Voltage Control (AVC) subassembly mounted on an oscillating base adapted for back and forth movement across a weld joint and a motor mounted to the oscillating base which produces the back and forth movement of the oscillating subassembly relative to a rotation plate.

A device is provided in U.S. Pat. No. 8,987,637 to Messina, which oscillates a welding torch head while moving the torch head along a circular weld path, under the control of a signals generated by a controller, allowing an operator of the torch to control amplitude of the oscillation, the speed of the back and forth movement and the dwell time spent at each turning point, the device providing a motor with a threaded rod which extends and retracts to provide the oscillating movement.

II. SUMMARY OF THE INVENTION

Oscillating welding devices are used in the industry to provide for the automated linear or pendulum welding stroke using an oscillating welding head on a stationary target welder to promote uniformity of the welding stroke, depth and integrity at a welded joint of a workpiece which is difficult to duplicate by hand. These welders have evolved to incorporate microprocessors which allow the user to set the location of the welding head and then vary the depth, timing and delay of the welding stroke depending upon the workpiece.

The present oscillating welding device provides the welding head of the welding device using an internal rack and pinion type system controlled by a remote control device having a microcontroller providing adjustment for the welding head reciprocating stroke speed, the width of each stroke, and a pause from 0-1 second at the sides to control the wash of the welding edges, with a manipulator, the welding head and the oscillator contained in a single unit reducing the cost of the device and increasing the compact portability of the unit adapted to limited workspace and usable within a confined space.

Additionally, to provide for portability of the oscillating welding device, a portable and adjustable welding stand which mounts the oscillating welding device is provided to direct a secured welding gun tip from a welder to any location and at nearly any angle, providing the oscillating welding device to be presented to a workpiece, as opposed to being required to bring the workpiece to the oscillating welding device. The portable welding stand providing secure adjustment of height, angle and positioning of the oscillating welding device and attached welding gun tip in multiple three dimensional adjustment planes, the welding stand being readily transportable in a chosen location within a welding shop or on a welding floor, the portable welding stand having a heavily weighted base and rollers for transport and includes both gross adjustment means and fine adjustment means for full control of the multiple positioning location of the oscillating welding device within the welding stand.

III. DESCRIPTION OF THE DRAWINGS

The following drawings are submitted with this utility patent application.

Figure 1:
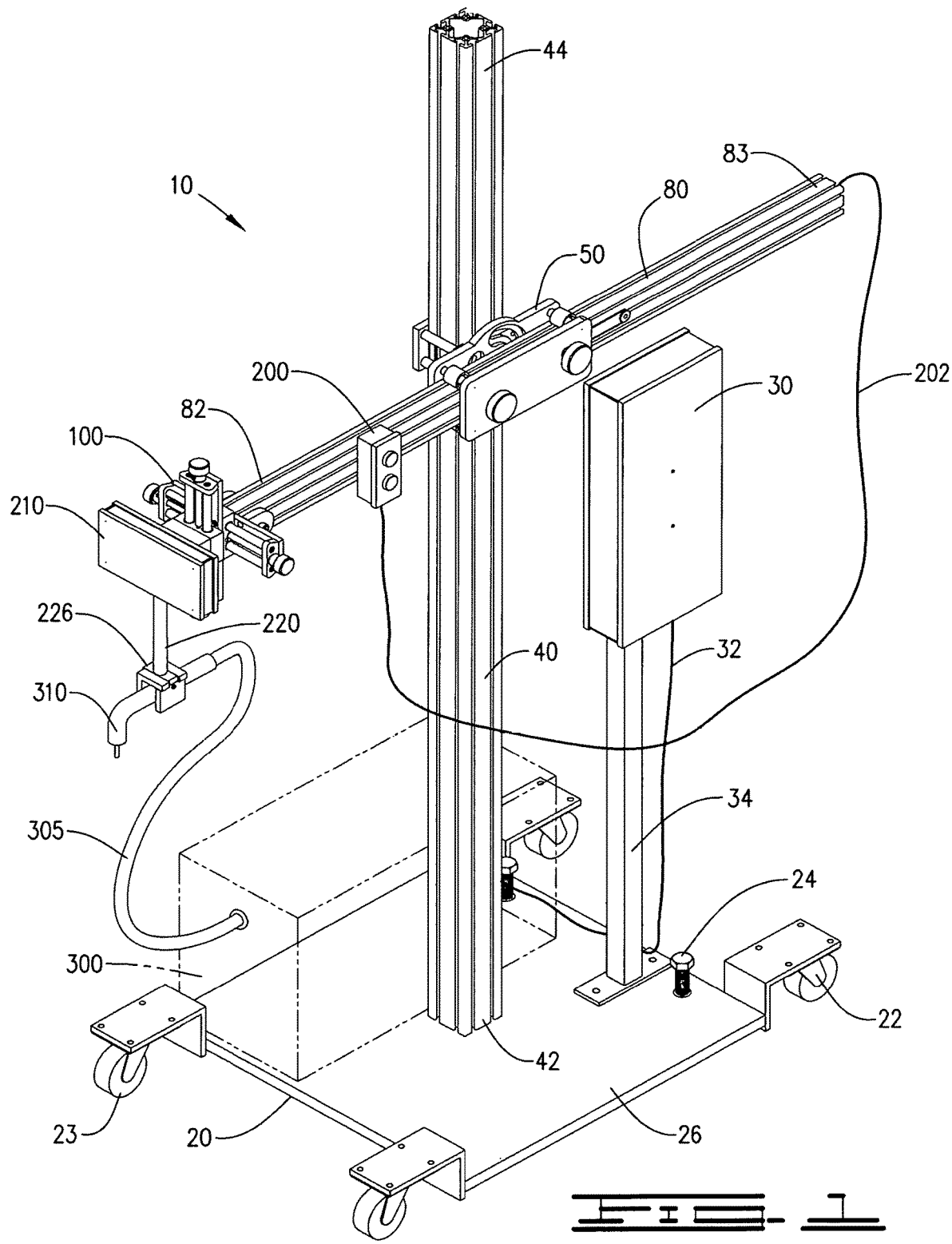
FIG. 1 is a perspective view of the reciprocating welding head mounted upon the portable adjustable welding stand.
Figure 2:
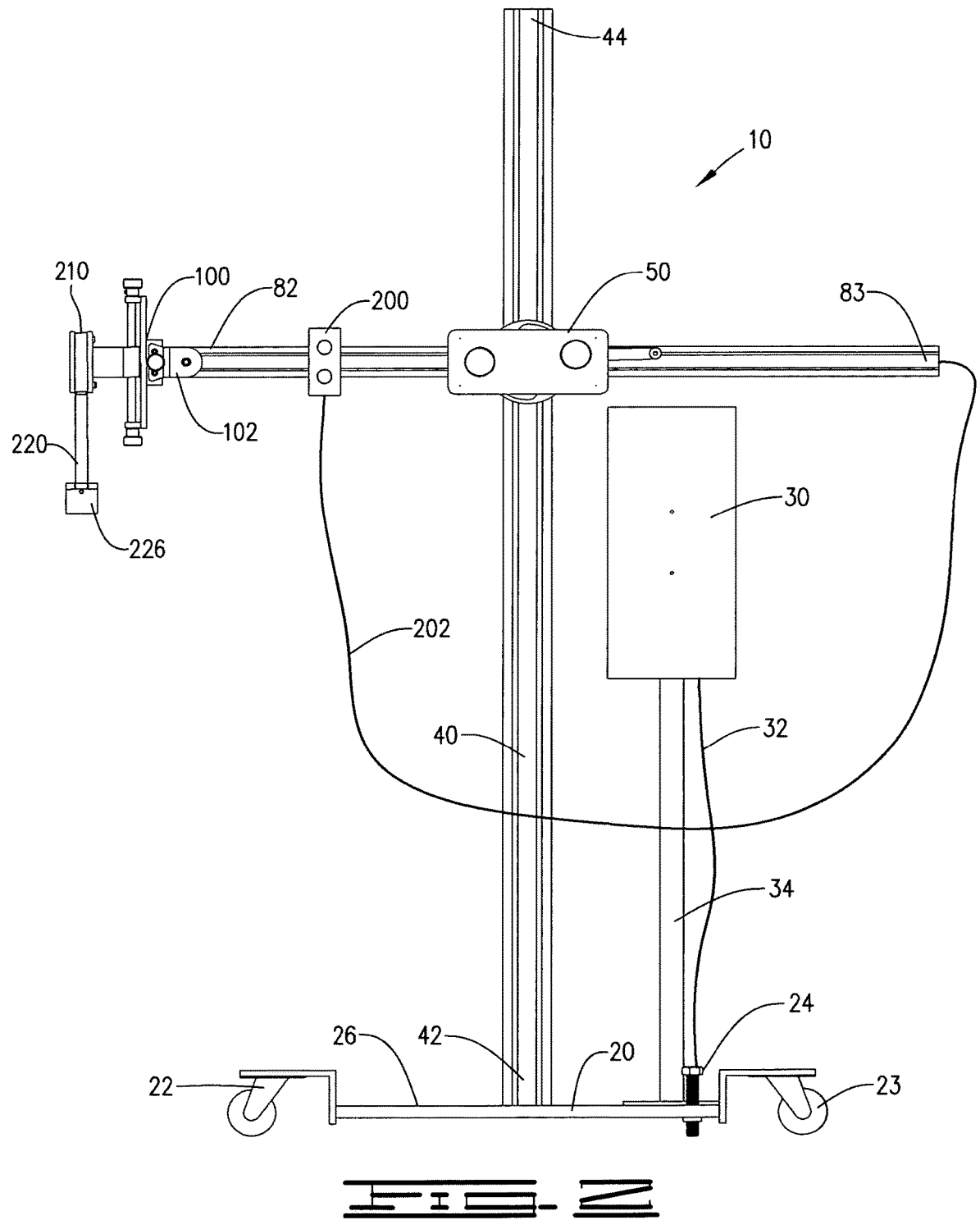
FIG. 2 is a side view of FIG. 1.

FIG. 8 is a front view of the oscillating welding head with the front cover plate and slide bracket removed to expose the incremental rotating drive gear and the rear pinion bar with phantom lines indicating an incremental rotational movement pathway capacity of the drive gear and the rear pinion bar, the rear pinion bar supported by at least two bearing members while mounting to the back surface of the slide bracket.

IV. DESCRIPTION OF THE PREFERRED EMBODIMENT

A portable reciprocating welding device 10, FIGS. 1-8, supplies a self-contained unit comprising a portable weighted base 20, a multiple adjustment frame member, a controller unit 200 and an oscillator unit 210 having an internal bi-directional driver 250 to provide linear reciprocating movement to a welding tip 310 from a welding machine 300, the welding tip 310 held within a tip clamp assembly 228 at the lower end 224 of a reciprocating arm 220 driven by the oscillator unit 210 by the controller unit 200 to control the reciprocating stroke, speed, width of each stroke, and a pause from 0-1 second at the sides of each stroke to control the wash of the welding edges. The oscillator unit 210 and controller unit 200 are mounted on the common portable weighted base 20 and cross support post to reducing the cost of the device 10 and increasing the compact portability of the device adapted to limited workspace and usable within a confined space.

The portable reciprocating welding device 10 is delivered to the location of the workpiece as opposed to other reciprocating welders which are heavy and non-portable and require deliver of the workpiece to the reciprocating welders. In these other reciprocating welders and systems, the workpiece is placed in a stationary location, and if movement of the workpiece is required during the welding process, such movement is performed by means known in the art, including timed rollers, or desired linear movement manipulation, preferable by automated or machine controlled movement devices. A power box 30 extending from the platform base 20 by a support post 34 provides for local power to the oscillating welding device 10, the power box 30 having an electrical plug 32 for providing electricity to the controller unit 200, the oscillating unit 210 and perhaps even the welding machine 300 set upon the upper surface 26 of the portable weighted base 20, as shown in FIG. 1.

The multiple adjustments of the present multiple adjustment frame member includes adjustment to height, length and angle of the welding tip to place the welding tip in a precise desired location with consideration given to the plane of the workpiece weld. Once the frame member is set, the operator would then enter the desired welding tip movement and information into the controller unit 200, preferably using preset digital input data, and then commence the oscillating welding process performed by the oscillator unit 210. There is a digital transmission cable or controller wire 202 connecting the controller unit 200 to the oscillator unit 210 for digital signal transmission and control. The device 10 as shown in FIGS. 1-4 and 6-8, is designed for linear reciprocating movement, although with replacement of a linear rack 260 within the oscillator unit 210 with an arced of curved rack, a pendulum reciprocating movement could be performed, where appropriate.

The portable weighted base 20 and the multiple adjustment frame member, FIGS. 1-4 and 6, further define the weighted base 20 define a plurality of wheel assemblies 22 having wheels 23 which allow for movement of the weighted base 20 to be moved across a flat floor, the weighted base further providing a brake 24 to set the portable weighted base 20 securely at a desired location without further movement. The weighted based 20 further defines an upper surface 26 to which a lower end 42 of the vertical support post 40 is attached, the vertical support post 40 further defining an upper end 44. A cross support post 80 is slidably connecting to the vertical support post 40 by a transitional post bracket 50 which has the capacity to be move up and down the vertical support post 40, to extend and retract the cross support post 80, and also to adjust an angle between the vertical support post 40 and the cross support post 80, the transitional post bracket 50 locked to position cross support member 80 where desired at a static location. The cross support post 80 further defines a free end 83 and a working end 82, with the working end 82 attaching a pivotal clamp 102 and a fine adjustment assembly 100 to provide for precision location of the fine adjustment assembly 100 to which is attached the oscillating unit 210.

Figure 6:
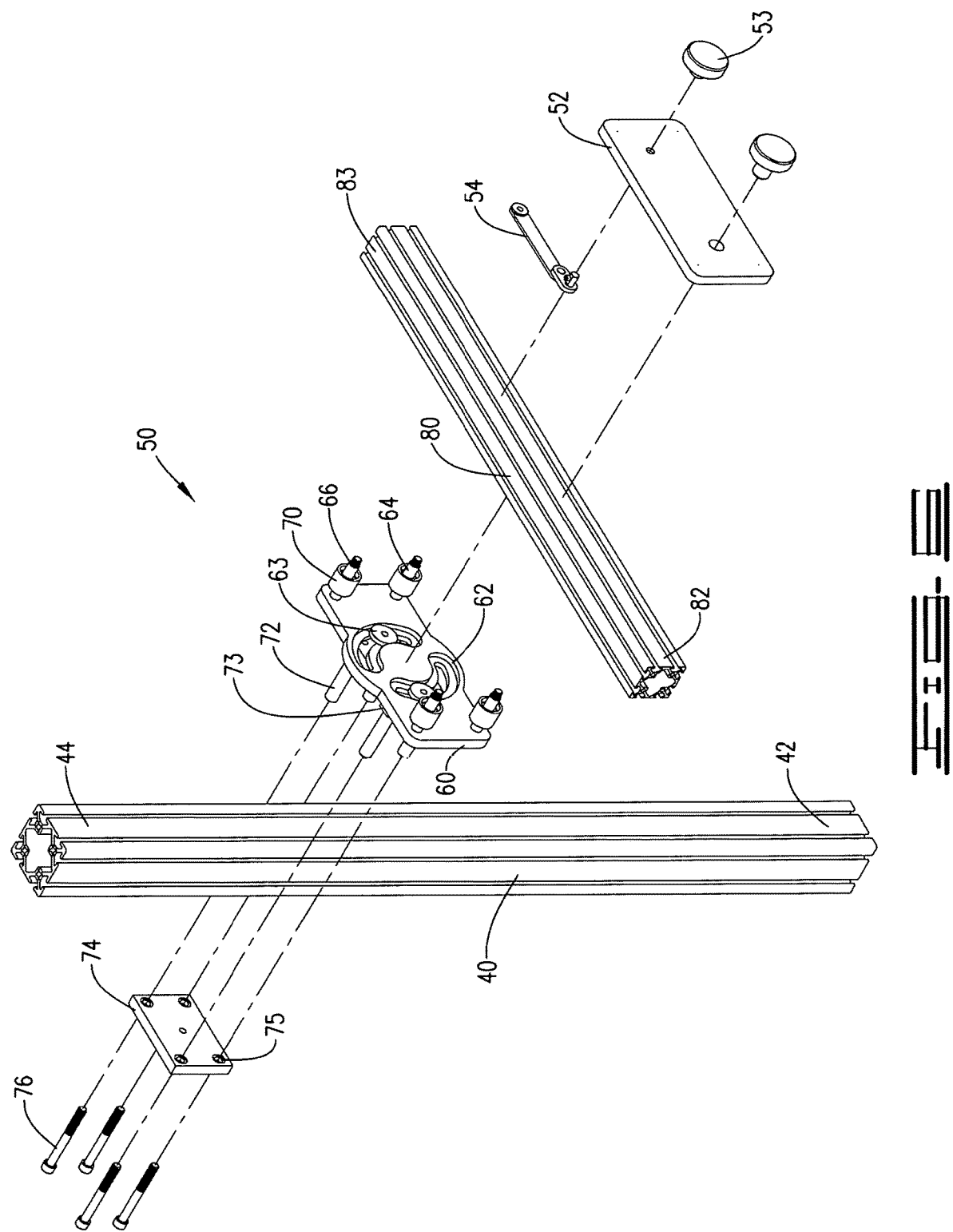
FIG. 6 is an exploded view of the axial adjustment bracket between the vertical support member and the horizontal support member of the portable welding stand.

The transitional post bracket 50, in order to accomplish the multiple angle adjustments previously defined, and as shown in FIG. 6, requires a multiple component assembly defining a front plate 52, a middle bearing plate 60 and a rear plate 74. The front plate 52 further defines a slide brake 54 interacting with the cross support post 80 to restrict motion of the cross support post 80 during movement and at least one lock nut 53 to secure the cross support post 80 within the transitional post bracket 50. The middle bearing plate 60 provides for the cross support post 80 to slide within the transitional post bracket 50 during adjustment, allows the transitional post bracket 50 to slide up and down upon the vertical support post 40 during adjustment, and allows for pivotal movement of the cross support post 80 in relation to the stationary vertical support post 40 during adjustment, the middle bearing plate 60, in the embodiment shown in FIG. 6, comprising at least one arced groove 62, at least one tilt bearing 63, preferably a radial pair of tilt bearings 63, a plurality of bearing posts 64 defining a threaded extension 66 for attachment to the front plate 52 and plurality of supporting front slide bearings 70 corresponding to the number of bearing posts 64 and attached upon each respective bearing post 64, a plurality of rear bolt sleeves 72 each containing a respective rear slide bearing 73, and a plurality of bracket bolts 76 attaching the rear plate 74 to each respective rear bolt sleeve 72 through aligned bolt holes 75, wherein the vertical support post 80 slides within the transitional post bracket 50 through reduced friction by the plurality of rear slide bearings 73, the cross support post 80 slide within the transitional post bracket 50 aided by the front slide bearings 70, and the cross support post 80 is tilted within the transitional slide bracket 50 aided by the tilt bearings 63 as they are shifted within the arced grooves 62 within the middle bearing plate 60 of the transitional slide bracket 50. While shown and disclosed as embodied in FIG. 6, the transitional post bracket 50 may be comprised of different elements and features than disclosed, provided the movements expressed in this paragraph are consistent with the objective movement of the presented transitional post bracket 50.

Figure 3:
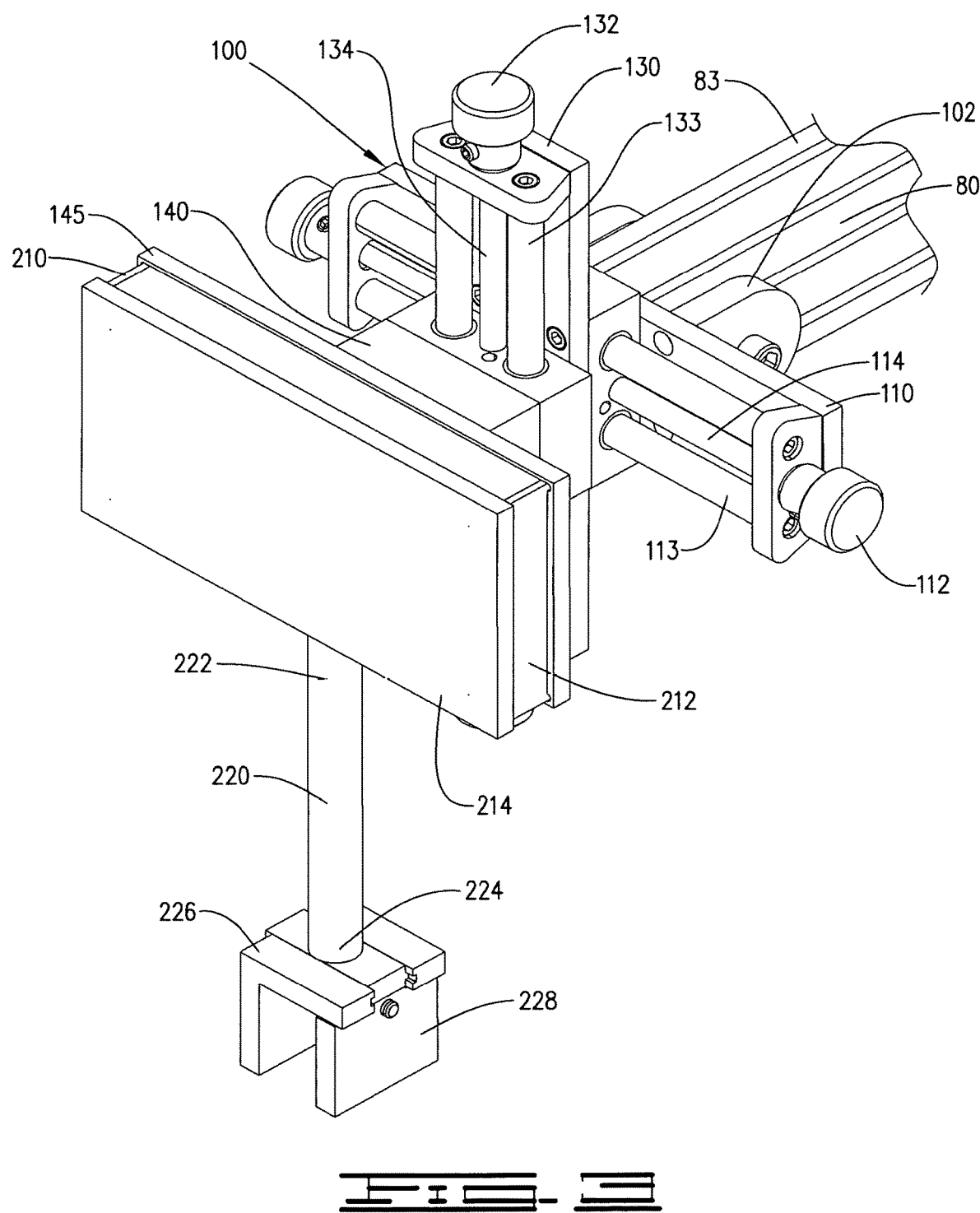
FIG. 3 is an isolated front view of the reciprocating welding head mounted upon the fine adjustment bracket of the portable adjustable welding stand of FIG. 1.
Figure 4:
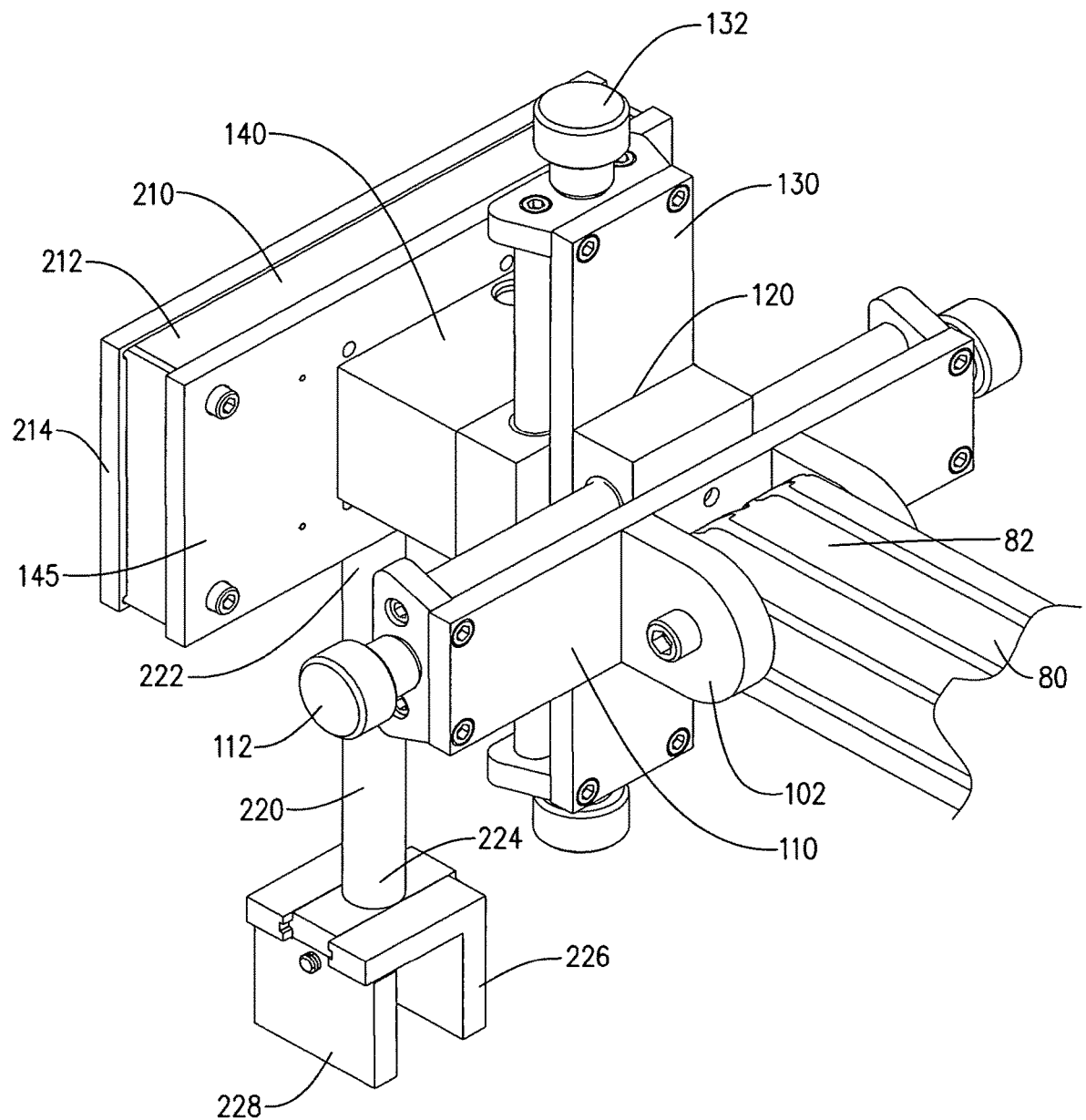
FIG. 4 is a rear view of the reciprocating welding head mounted upon the fine adjustment bracket of the portable welding stand.
Figure 5:
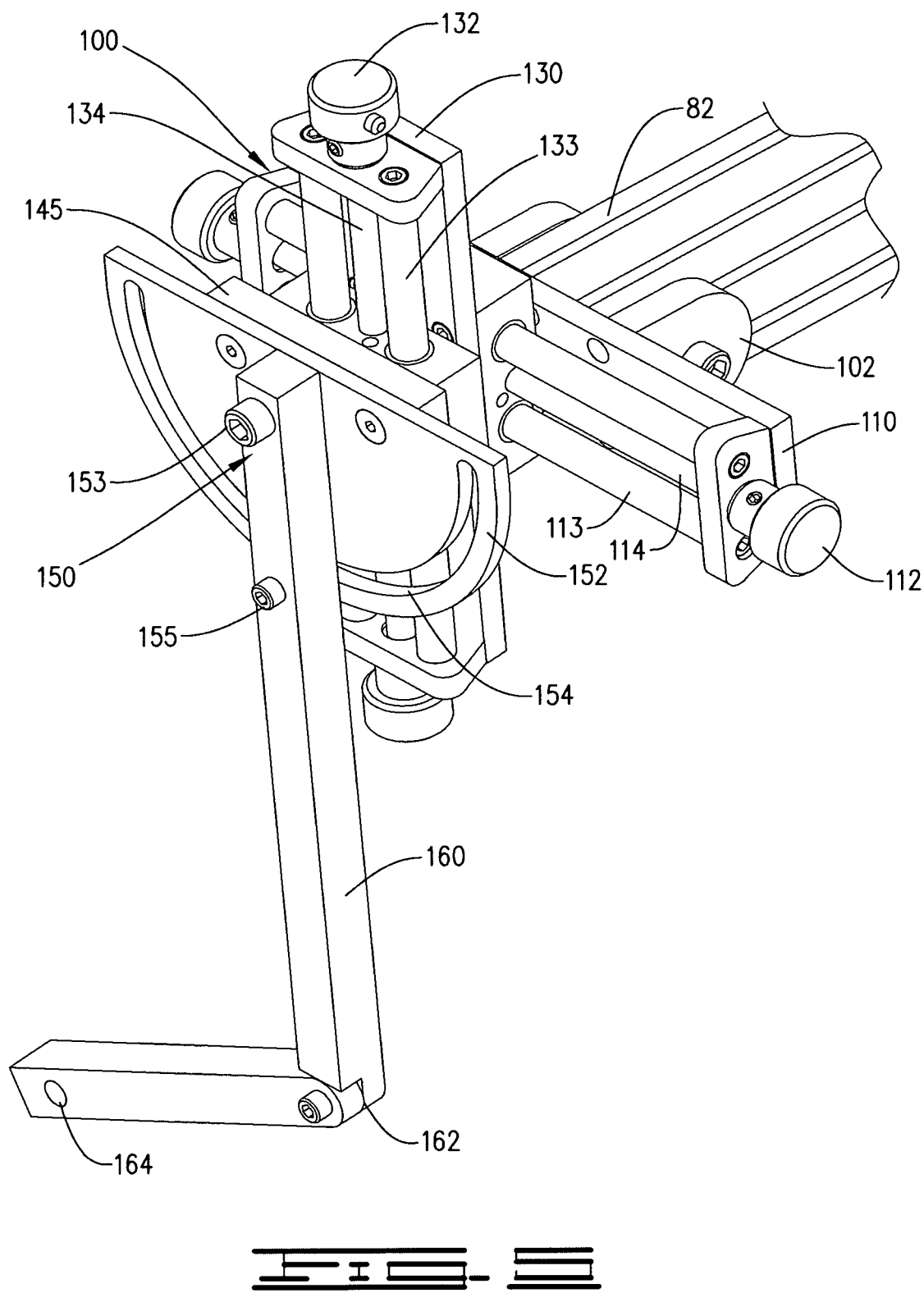
FIG. 5 is an isolated front view of the fixed welding head mounted upon the fine adjustment bracket of the portable welding stand.

The fine adjustment assembly 100 is most expressly shown in FIGS. 3-5 of the drawing figures, which represent a preferred embodiment to accomplish the fine adjustment movement required by precision adjustment of the disclosed oscillating welding device 10. As disclosed, the fine adjustment assembly 100 comprises the pivotal clamp 102 attached to the working end 82 of the cross support post 80 which further attaches a horizontal fine adjustment member 110, a transitional bracket member 120, a vertical fine adjustment member 130 and a vertical plate extension 140 attaching a mounting plate 145. The horizontal fine adjustment member 110 further comprises at least one adjustment knob 112, at least one slide bar 113 and a horizontal adjustment bar 114 providing rotational movement of the adjustment knob 112 to the horizontal adjustment bar 114 to move the transitional bracket member 120 left or right in fine increments of horizontal movement. The vertical fine adjustment member 130 further comprises at least one adjustment knob 132, at least one slide bar 133 and a vertical adjustment bar 134 providing rotational movement of the adjustment knob 132 to the vertical adjustment bar 134 to move the vertical plate extension 140 and mounting plate 145 up or down in fine increments of vertical movement. This fine adjustment assembly 100 is intended for final adjustment of the oscillator unit 210 prior to the procedure of conducting the oscillating welding action to a workpiece.

Figure 7:
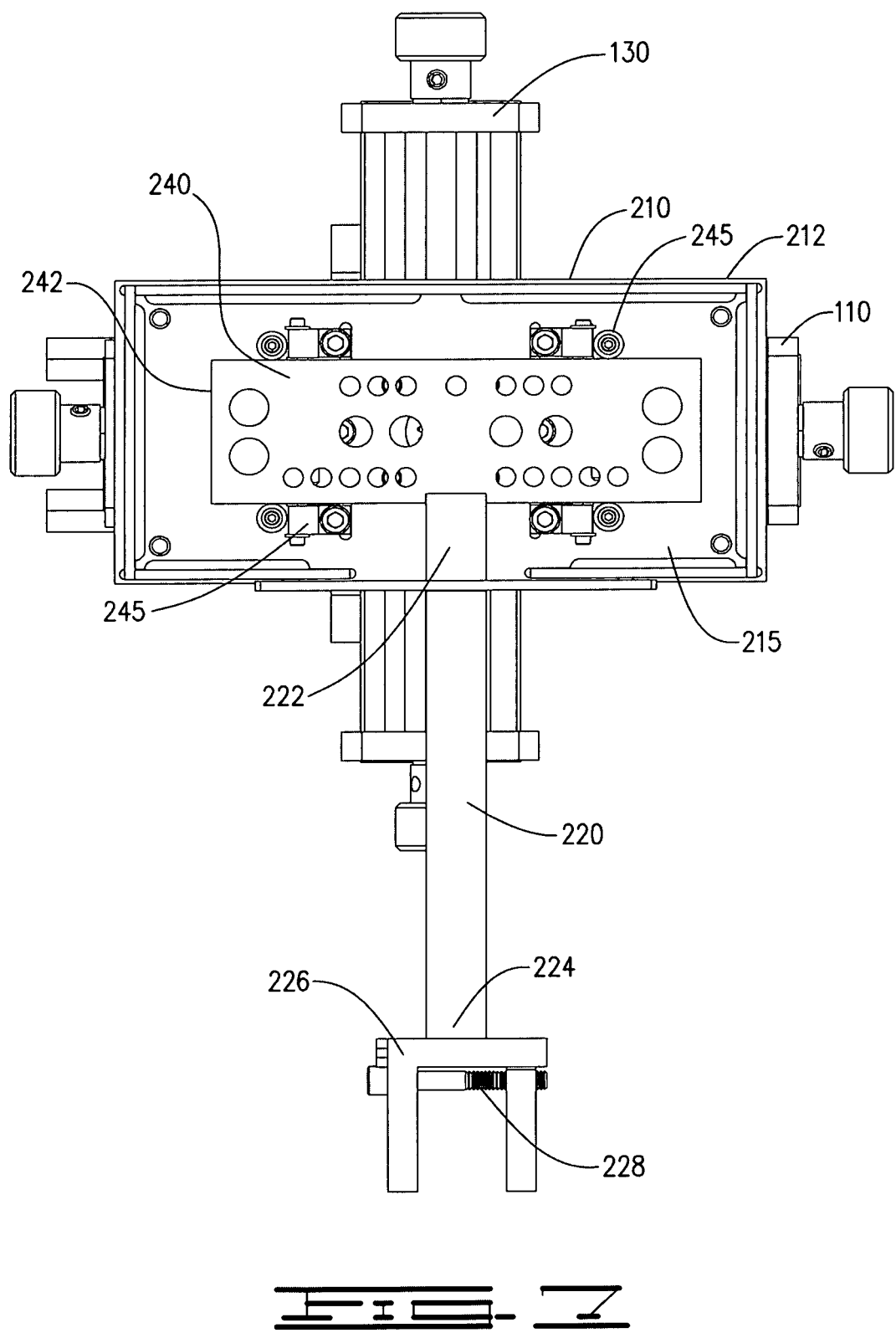
FIG. 7 is a front view of the oscillating welding head with the front cover plate removed exposing the slide bracket attached to the welding tip anchor bar, with the slide bracket suspended within the upper and lower horizontal roller bearing members.

The oscillator unit 210 further attaches to the mounting plate 145 of the fine adjustment assembly 100. The oscillator unit 210 is activated and controlled by the controller unit 200 which attaches by the controller wire 202 and is provided power through the power box 30. The oscillator unit 210, shown in FIGS. 1-4 and 6-8, defines a case 212 having a removable cover plate 214 and contains a cavity 215. The cavity 215 includes a slide member 240 suspended laterally within a plurality of roller assemblies 245 which allow for restricted oscillating movement of the slide member 240 within the roller assemblies 245 within the cavity 215 of the oscillator unit 210, as indicated in FIG. 7. The slide member 240 is compelled in its oscillating movement by interaction of a driver 250 or motor, which causes a limited rotation of a drive gear 255 which compels an oscillating movement of a rack 260 attached to a rear surface 242 of the slide member 240, causing incremental movement of the slide member 240 in an oscillating motion. While shown as linear, the rack 260 may also be provided as an arc, which would create a pendulum movement of the slide member 240 as opposed to a linear oscillating movement, as would be obtained from the components as shown in FIGS. 7 and 8. This oscillating movement of the slide member 240 is transferred to the reciprocating arm 220, the reciprocating arm 220 attaching to the slide member 240 by an upper end 222 defining a slide bar connector 223, FIG. 8, the reciprocating arm 220 defining the lower end 224 which attaches the welding tip retainer 226 of FIGS. 1, 7 and 8, the welding tip retaining 226 including a tip clamp assembly 228, FIGS. 7-8. The welding tip retainer 226 holds the welding tip 310 connected by the welding lead 305 from the welder 300, which may include an arc welding, a MIG welding or a TIG welding device.

In yet another option defined within the scope of this oscillating welding device is an optional fixed clamp assembly 150 which converts the oscillating welding device 10 to a stationary welding device by the installation of the fixed clamp assembly 150 to the mounting plate 145 in lieu of the oscillator unit 210 during a fixed welding procedure using the same support device for a temporary procedure. The fixed clamp assembly 150, shown in FIG. 5, defines a pivot plate 152, a pivot anchor bolt 153 for an adjusted planar arced movement of the fixed clamp assembly 150, an angular groove 154 including an angular adjustment bolt 155, a pivotal adjustment arm 160 attached to the pivotal plate 152 by the pivotal anchor bolt 153 and attached within the angular groove 154 by the angular adjustment bolt 155 to allow for movement on a plane of the pivotal adjustment arm 160, a pivot joint 162 within the pivotal adjustment arm 160 which attaches a welding tip retainer end 164, wherein a welding tip 310 from a welder 300 can be attached to the welding tip retainer end 164 by a similar welding tip retainer 226 as used with the reciprocating arm 220, not shown in the drawings, for conducting stationary welding, including sub-arc welding, of a moving workpiece where necessitated by the welding task being performed by the user.

The movement between the drive gear 255 and the linear embodied rack 260 causes the reciprocating movement within the linear oscillator unit 210, with the driver 250 or motor turning the drive gear 255 in incremental rotational units with a width between 0-1½ inches, a variable reciprocating frequency of between 0 and 60 cycles per minute, and a reverse motion delay in milliseconds at the sides of the weld to help control wash of these side edges and elevate the outer margins as the weld is built within the target seam. The driver 250 is preferably a step motor operated by pulse signals to conduct the clockwise and counter-clockwise reciprocating movements, and can be incrementally increased or decreased, depending upon the required seam being welded, the pitch of the adjacent welding surfaces, and the type of metals being welded at a given amperage and voltage. Therefore, it is contemplated that a software and computer generated program would be implemented within the controller to allow for the origination and generation of the digital signals to integrate with the oscillator unit to ensure reliable and repeatedly accurate information transfer to provide for repeated performance and results within the portable reciprocating welding device 10.

As shown in the illustrations, the preferred material used in the composition of the vertical support post 40 and the cross support post 80 is a square dimensional extruded metal having linear grooves on each respective perimeter flat surface. This type extruded metal is shown to be lightweight and very strong. The preferred metal is aluminum because is does not corrode and is more resistant to debris buildup if periodic cleaning is employed. Surfaces can be cleaned by wiping and a cleaning solution. Likewise, the cross support post 80 is preferred as dimensional extruded metal, also with linear grooves. The composition of the transitional post bracket 50 is best presented as metal plates and rollers. The fine adjustment assembly 100 can be made of metal or a high density plastic or other composite materials, but metal is the preferred material of choice throughout the entire device 10. Some metal components may be painted, made from corrosion resistant materials including aluminum and stainless steel, powder coated or treated with any surface protection that does not interfere with the movements, adjustment or locking capability of the various components.

The benefits of the present oscillating welding device 10 are several. First, the weighted base 20 on wheels 23 allow for the device to be moved in any direction along a floor as well as gross rotation in 360 degrees. Second, the vertical support post 40 and the cross support post allow for a gross vertical elevation from floor to the top of the vertical support post 40. Third, the transitional post bracket 50 attaching the cross support post 80 and vertical support post 40 provide for a full or at least near full 360 degree gross rotation in a vertical plane. Fourth, the relationship between the cross support post 80 and the transitional post bracket 50 provide for gross movement extension and retraction of the cross support post 80 within the transitional post bracket 50, which can be in any direction due to the rotary freedom accomplished by the transitional post bracket 50 and the vertical support post 40 and cross support post 80. Fifth, the vertical fine adjustment member 130 allows for fine movement up and down within the fine adjustment assembly. Sixth, the horizontal fine adjustment assembly 110 allows for fine movement right to left within the fine adjustment assembly. Seventh, the pivotal clamp 102 allows for movement of the fine adjustment assembly 100 up to 180 degrees. Eighth, the welding tip retainer 226 on the end of the reciprocating arm 220 allows for positioning of the welding tip 310 at multiple angles and extensions as set by the operator. Once all the proper angles are determined by the operator, and each adjustment is made to the overall gross positioning of the welding tip towards the intended object to be welded by the welding tip and finalizing fine movement up and down and side to side by the fine adjustment assembly as needed prior to and during the welding operation, especially where the workpiece being welded is moved or rotated during the welding or cutting procedure. Basically, the present device allows a welder to position the welding tip at any height or angle chosen for a welding or cutting project through one or more of the movement locations demonstrated within this paragraph.

While the portable reciprocating welding device 10 has been particularly shown and described with reference to a preferred embodiment thereof, it will be understood by those skilled in the art that changes in form and detail may be made therein without departing from the spirit and scope of the invention.

What is claimed is:

1. A portable reciprocating welding device with multiple adjustment options while providing an oscillating welding movement comprising:
    a portable weighted base;
    a vertical support post extending from said portable weighted base, a cross support post and a transitional post bracket connecting said cross support post to said vertical support post said cross support post having a capacity to be raised or lowered locked into position along said vertical support post, enabling said cross support post to be set at an angle in relation to said vertical support post up to 270 degrees and providing for extension and retraction of said cross support member from said vertical support post;
    a controller unit mounting upon said cross support post; and
    an oscillator unit mounted upon said cross support post, said oscillator unit containing an internal bi-directional driver to provide linear reciprocating movement to a welding tip from a welding machine, said welding tip held within a fixed clamp assembly at an end of a reciprocating arm driven by said oscillator unit as directed by said controller unit to control a reciprocating stroke, speed, width of each stroke, and a pause from 0-1 second at the sides of each stroke to control the wash of the welding edges, said oscillator unit and said controller contained on said cross support post to reducing the cost of said device, enhancing said portability of said device and adapting said device to a limited workspace area or a confined space.

2. The portable reciprocating welding device of claim 1, further comprising:
    said portable weighted base extending a support post upon which a power box with a power cord attached.

3. The portable reciprocating welding device of claim 1, said transitional post bracket comprising:
    a front plate defining a slide brake interacting with said cross support post to partially restrict motion of the said cross support post during movement and at least one lock nut to secure the cross support within the transitional post bracket;
    a middle bearing plate enabling said cross support post to slide within said transitional post bracket during adjustment, said transitional post bracket capable of sliding up or down said vertical support post, and providing pivotal movement of said cross support post in relation to said stationary vertical support post during adjustment, said middle bearing plate defining at least one arced groove, at least one tilt bearing, a plurality of bearing posts defining a threaded extension for attachment to said front plate and a plurality of supporting front slide bearings corresponding to a number of bearing posts and attached upon each of said respective bearing posts, a plurality of rear bolt sleeves mounting a respective rear slide bearing; and
    a rear plate attached by a bracket bolts to each of said respective rear bolt sleeves through aligned bolt holes in said rear plate, wherein said vertical support post slides within said transitional post bracket through reduced friction by the plurality of rear slide bearings, said cross support post slides within the transitional post bracket aided by said front slide bearings, and said cross support post is tilted within said transitional slide bracket aided by said tilt bearings when shifted within said at least one arced groove within said middle bearing plate of said transitional post bracket.

4. The portable reciprocating welding device of claim 1, further comprising:
    said cross support post defining a work end attaching a pivotal clamp having the capacity of angular movement in relation to said cross support member up to 180 degrees; and
    a fine adjustment assembly attached to said pivotal clamp defining a horizontal fine adjustment member, a transitional bracket member, a vertical fine adjustment member and a vertical plate extension attaching a mounting plate, said horizontal fine adjustment member further defining at least one adjustment knob, at least one slide bar and a horizontal adjustment bar providing rotational movement to said horizontal adjustment bar to move said transitional bracket member left or right in fine increments of horizontal movement, said vertical fine adjustment member further defining at least one adjustment knob, at least one slide bar and a vertical adjustment bar providing rotational movement said vertical plate extension and mounting plate up or down in fine increments of vertical movement, said fine adjustment assembly used for precision final adjustment of said oscillator unit prior to conducting said oscillating welding.

5. The portable reciprocating welding device of claim 1, further comprising:
    said controller unit extends a controller wire which is attached to said oscillator unit;
    said oscillator unit further defines a case, a detachable cover plate and a cavity; and
    said cavity contains said internal bi-directional driver to incrementally rotate a drive gear clockwise or counter clockwise which movement compels a reciprocating movement of a rack attached to a rear surface of a slide member suspended within a plurality of roller assemblies within said cavity of said case of said oscillator unit, said slide member attaching to an upper end of said reciprocating arm, said movement of slide member being transferred into oscillating movement of said reciprocating arm, further directing a lower end of said reciprocating arm in the said movement as said slide member, said lower end attaching said welding tip retaining defining a tip clamp assembly, finally providing said oscillating movement to said welding tip retained within said welding tip retainer, wherein movement between said drive gear compelled by said internal bi-directional driver in pulsed incremental rotational units of degrees, compelling said rack to a width between 0-1½ inches, with a variable reciprocating frequency of between 0 and 60 cycles per minute, and a reverse motion delay in milliseconds at the sides of the weld to help control wash of these side edges and elevate the outer margins as the weld is built within the target seam depending upon the required seam being welded, the pitch of the adjacent welding surfaces, and the type of metals being welded at a given amperage and voltage, said controller unit containing a software and computer generating program providing for an origination and generation of a digital signal to integrate with said oscillator unit to ensure reliable and repeatedly accurate information transfer to provide for repeated performance and results within said portable reciprocating welding device.

6. The portable reciprocating welding device of claim 1, further comprising a fixed clamp assembly converting said portable reciprocating welding device to a stationary welding device by the installation of the fixed clamp assembly to said mounting plate in place of said oscillator unit during a fixed welding procedure using the same support device, said fixed clamp assembly comprising:
   a pivot plate defining an angular groove;
   a pivot anchor bolt for an adjusted planar arced movement of said fixed clamp assembly;
   an angular adjustment bolt;
   a pivotal adjustment arm attached to said pivotal plate by said pivot anchor bolt and attached within said angular groove by said angular adjustment bolt to provide planar movement of said pivotal adjustment arm; and
   a pivot joint within said pivotal adjustment arm attaching a welding tip retainer end, wherein a welding tip from a welder is attached to said welding tip retainer end by a welding tip retainer for conducting stationary welding where necessitated by a user.

\* \* \* \* \*